United States Patent [19]

Fyffe

[11] Patent Number: 5,556,550
[45] Date of Patent: Sep. 17, 1996

[54] GAS LENS COLLET BODY

[75] Inventor: Steve Fyffe, Wimauma, Fla.

[73] Assignee: Welding Nozzle International, Palmetto, Fla.

[21] Appl. No.: 414,115

[22] Filed: Mar. 31, 1995

[51] Int. Cl.⁶ .................................. B23K 9/16
[52] U.S. Cl. .............................. 219/75; 219/136
[58] Field of Search ...................... 219/74, 75, 136

[56] References Cited

U.S. PATENT DOCUMENTS

| | | | |
|---|---|---|---|
| 3,053,968 | 9/1962 | Gorman et al. | 219/75 |
| 3,180,967 | 4/1965 | Hill | 219/75 |
| 3,521,023 | 7/1970 | Dahlman et al. | 219/75 |
| 4,275,284 | 6/1981 | Conley | 219/75 |
| 4,521,670 | 6/1985 | Case Jr. et al. | 219/136 |
| 4,532,406 | 7/1985 | Povlick et al. | 219/75 |
| 4,788,401 | 11/1988 | Kleppen | 219/75 |
| 5,393,949 | 2/1995 | Stricklen | 219/75 |

FOREIGN PATENT DOCUMENTS 206766  11/1968  U.S.S.R. .................. 219/75

Primary Examiner—Clifford C. Shaw
Attorney, Agent, or Firm—Sughrue, Mion, Zinn, Macpeak & Seas

[57] ABSTRACT

A gas lens collet body for use in a gas tungsten arc welding torch includes a stem portion and an outer body shell constructed from a single piece of copper to provide increased electrical conductivity and a lower co-efficient of thermal expansion. An axially extending bore in the stem portion is adapted to receive a collet and electrode and an annular passage is formed between said stem portion and said outer body shell. A plurality of concentric fine mesh stainless steel screens are mounted in an outlet end of the annular passage and a plurality of holes interconnect the bore with the annular passage at an angle of 10°–15° relative to a longitudinal axis of the bore. Thus a shield gas introduced into the bore will pass through the angled passages into direct engagement with the plurality of screens to provide a stable, virtually turbulence free, shielding gas stream pattern.

1 Claim, 3 Drawing Sheets

GAS LENS COLLET BODY

BACKGROUND OF THE INVENTION

The present invention is directed to a gas lens collet body and more specifically to a gas lens collet body used in the gas tungsten arc welding (GTAW) process.

Inert gas shielded welding torches have been in common use for many years. These torches employ a fixed tungsten metal electrode contained within a torch head constructed so that the electrode and welding zone is surrounded by a blanket of an inert gas. The gasses most normally used are helium and argon. Welding torches of this type are used especially with metals that are highly sensitive to oxidation. For many years, the industry standard gas lens collet body was constructed of two pieces. A first piece was the collet body stem made of copper and the second piece was an outer body shell made of brass. The copper collet body stem and the brass outer body shell were brazed together. The gas lens was provided with a central axially extending passage which tapered down at one end to a smaller diameter passage for receiving an electrode. An outer annular passage surrounded the inner passage and a plurality of radially extending bores were provided for directing the flow of a shield gas from the inner axially extending passage to the outer annular passage. A plurality of fine mesh screens were mounted at the forward end of the collet body stem in the annular passage for providing a non-turbulent flow of gas around the weld area.

Due to the use of the brass and the two-piece construction of the gas lens collet body, the lower conductivity and higher resistance of the brass causes the gas lens collet body to heat up more rapidly. The rapid heating would lead to substantial thermal expansion causing cracking of alumina oxide nozzles which were mounted on the body. Furthermore, the different co-efficients of thermal expansion between the copper collet body stem and the brass outer body shell would cause uneven expansion leading to the failure of the brazed joint therebetween, thereby causing a shielding gas leak. The provision of the radially directed holes interconnecting the axial passage and the annular passage causes a substantial increase in pressure leading to undue turbulence in the annular passage which could not be completely eliminated by the gas lens.

The U.S. patent to Kleppen (U.S. Pat. No. 4,788,401) discloses an inert gas welding torch and discloses the radial arrangement of the holes between an axial passage and an annular passage through which the shield gas will pass to the gas lens with the same drawback as noted above.

SUMMARY OF THE INVENTION

The present invention provides a new and improved gas lens collet body which overcomes the aforementioned drawbacks associated with the industry standard gas lens collet body.

The present invention provides a new and improved gas lens collet body which is of one piece construction machined from a solid piece of copper with no brazing required. The all copper gas lens is provided with gas holes in the main collet body stem which are drilled at an angle of 10° to 15° from the center line of the electrode orifice whereby the shield gas will pass from an axial passage in the main collet body stem to an annular passage between the outer body shell and the collet body stem for direct engagement with fine mesh screens disposed in said annular passage to provide a stable, virtually turbulence free shielding gas stream pattern.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
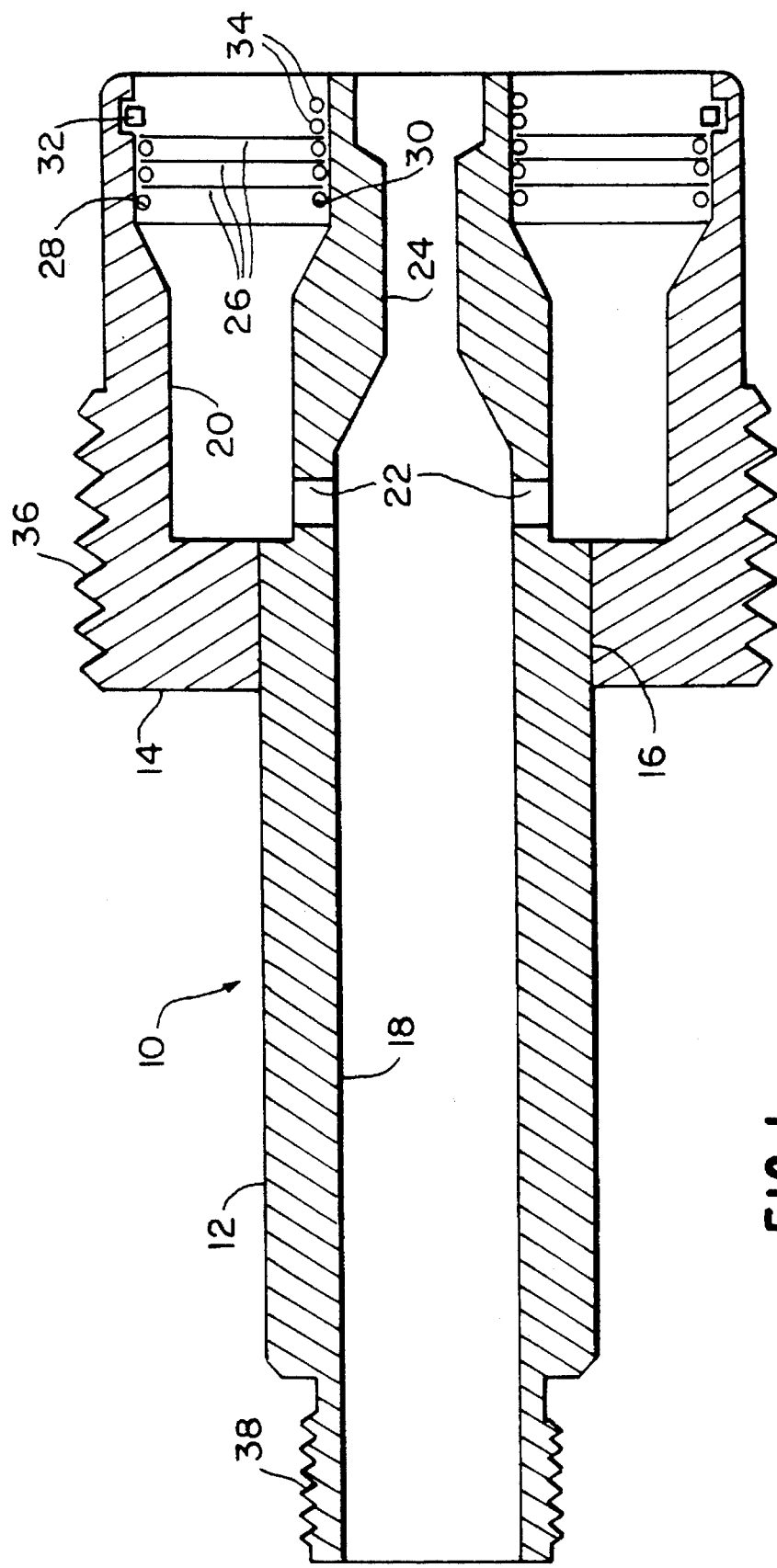
FIG. 1 is a longitudinal cross-sectional view of a prior art gas lens collet body.

In the prior art embodiment of FIG. 1, a gas lens collet body 10 is shown which has been the industry standard design for a number of years. The prior art gas lens collet body 10 is comprised of a copper collet body stem 12 and a brass outer body shell 14 which is connected to the collet body stem 10 by means of brazing along an annular face 16 between the stem and the outer body shell. The stem 12 is provided with an axially extending passage 18 which supplies a shielding gas. An annular passage 20 is formed between the main collet body stem 12 and the outer body shell 14 which is in communication with the axial passage 18 by means of a plurality of radially extending ports 22 through the stem 12. The axial passage 18 is provided with a reduced diameter portion 24 for the insertion of a tungsten electrode (not shown) which is conventional in the art.

A plurality of fine mesh screens 26 are provided at the outlet end of the annular passage 20. An outer spacer ring 28 and an inner spacer ring 30 are provided between each pair of adjacent screens 26. An outer retaining snap ring 32 is located in a groove in the outer body shell and a pair of retaining snap rings 34 engage the outer surface of the main stem 18. Screw threads 36 are provided on the outer body shell for securement of a nozzle and screw threads 38 are provided at the end of the stem 12 for mounting the body in a torch housing.

Figure 2:
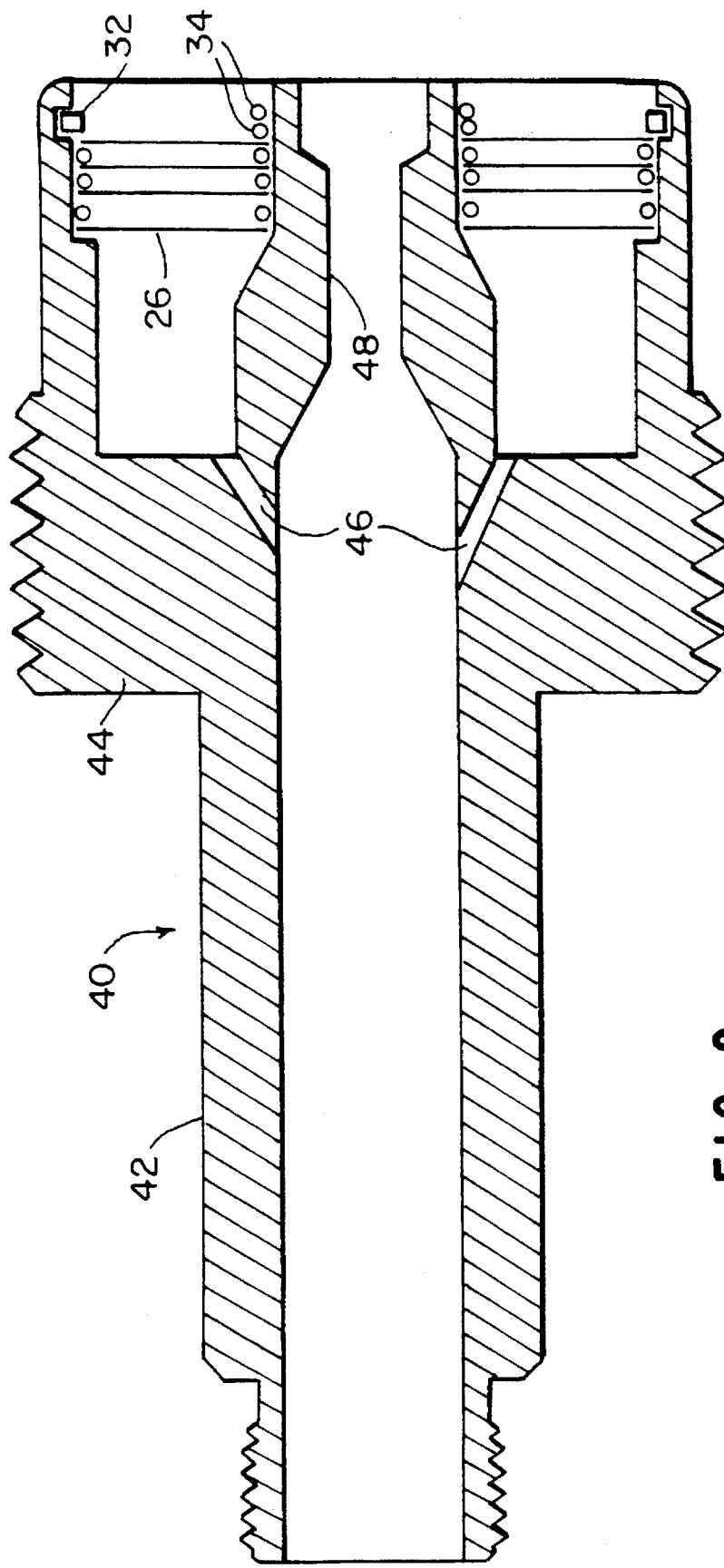
FIG. 2 is a longitudinal cross-sectional view of a gas lens collet body according to a first embodiment of the present invention.

In a first embodiment of the present invention as shown in FIG. 2, the overall external configuration of the gas lens collet body is substantially the same as that shown in FIG. 1 and the same reference numerals are used to designate identical components. However, the gas lens collet body 40 is constructed from a single solid piece of copper so that the stem 42 and the outer shell 44 has uniform electrical conductivity as opposed to the industry standard two piece construction shown in FIG. 1. The copper stem of the industry standard construction has a 93% electrical conductivity while the brass shell only has a 26% electrical conductivity. Thus, the all copper design of the present invention has a lower uniform co-efficient of thermal expansion than the standard brass/copper design which greatly reduces the possibility of thermal cracking of alumina oxide nozzles, which is often a problem when the gas lens collet body is heated up rapidly.

The all copper gas lens collet body as shown in FIG. 2 also utilizes a unique hole pattern wherein the plurality of gas holes 46 are drilled into the main collet body stem at an angle of 10°–15° from a center line of the electrode orifice 48. Such an arrangement of the gas holes directs the shielding gas flow directly onto the layers of concentric fine mesh stainless steel screens 26. Because the shielding gas is focused directly onto the fine mesh screens, the gas pressure (cubic feet per hour flow rate) may be reduced by 5% or more and produces a stable, virtually turbulence free, shielding gas stream pattern.

Figure 3:
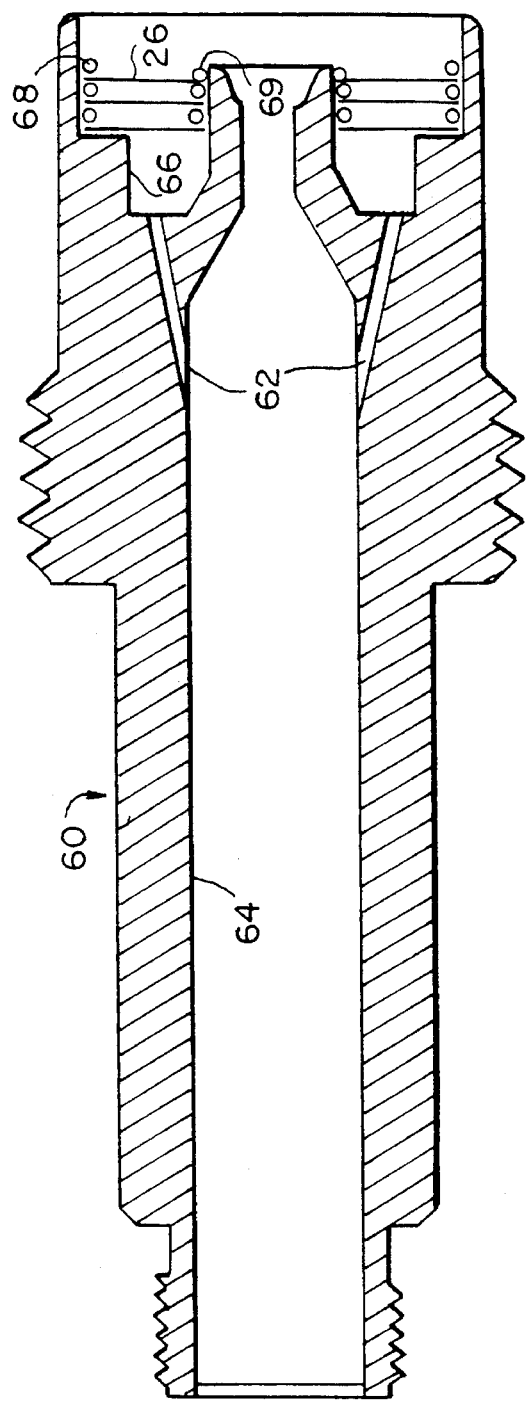
FIG. 3 is a longitudinal cross-sectional view of a gas lens collet body according to a second embodiment of the present invention.

A second embodiment of the present invention is shown in FIG. 3 wherein the gas lens collet body 60 has a reduced size with respect to the gas lens collet body 40 in FIG. 2. Once again the gas lens collet body 60 is made of a single solid piece of copper and the shield gas supply holes 62 which interconnect the axial passage 64 in the stem with the annular passage 66 are angled from 10°–15° to direct the shield gas directly onto the screens 26. The number of screens in FIG. 3 is reduced to three with the stack of screens and the spacers therebetween being held in position by means of an outer snap ring 68 and an inner snap ring 69.

Figure 4:
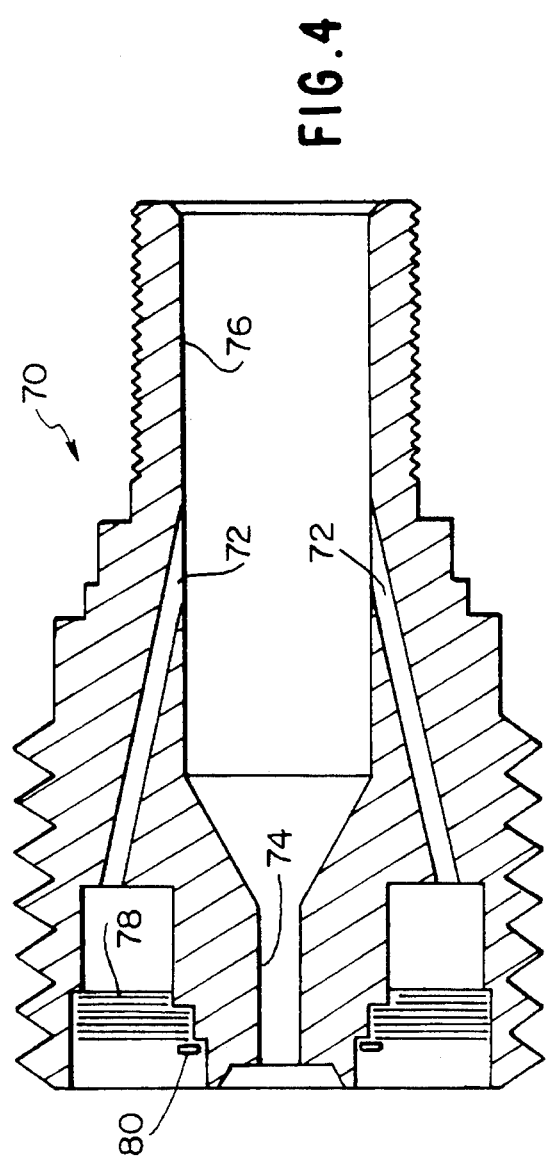
FIG. 4 is a longitudinal cross-sectional view of a gas lens collet body according to a third embodiment of the present invention.

A third embodiment of the present invention is shown in FIG. 4 wherein the gas lens collet body 70 is considerably smaller than the gas lens collet bodies shown in FIGS. 2 and 3. However, the collet body is made of one piece of solid copper having gas flow holes 72 drilled therein at an angle of 10°–15° relative to the center line of the electrode orifice 74. The gas holes 72 are spaced circumferentially about the axial passage 76 and direct the flow of shield gas from the passage 76 to impinge directly on the stack of screens 78 which are held in place by means of a snap ring 80.

The details of the operation of the torch including the ignition thereof and the different uses have been omitted since these are conventional and well known in the art. The principal feature of the present invention is the provision of a gas lens collet body in all three embodiments which is of one piece of solid copper to provide increased electrical conductivity and a lower co-efficient of thermal expansion. The provision of the angled gas holes in all three embodiments also provides a better flow of shield gas to the gas lens screens whereby the gas pressure may be reduced by approximately 5% and produce a stable, virtually turbulence free shielding gas stream pattern.

While the invention has been particularly shown and described with reference to preferred embodiments thereof, it will be understood by those in the art that the foregoing and other changes in form and details may be made therein without departing from the spirit and scope of the invention.

What is claimed is:

1. A gas lens collet body for use in a gas tungsten arc welding torch comprising a stem portion having an axial center line and a central bore extending co-axially with said axial center line through said stem for receiving and mounting a collet and electrode and defining a shield gas passage and an outer body shell integrally connected at one end to said stem and defining an annular passage between said body shell and said stem portion, wherein said body shell and said stem portion are constructed from a single piece of solid copper having said passages formed therein, and further comprising screen means mounted in an outlet end of said annular passage and a plurality of additional passages extending between said central bore and said annular passage at an angle of 10°–15° relative to said center line, whereby a shield gas may be directed from said central bore through said additional passages for impingement directly on said screen means in said annular passage.

* * * * *